United States Patent [19]
Spurr

[11] Patent Number: 6,078,156
[45] Date of Patent: Jun. 20, 2000

[54] METHOD AND APPARATUS FOR IMPROVED ELECTRONIC BRAKING OF A DC MOTOR

[75] Inventor: Robert W. Spurr, Rochester, N.Y.

[73] Assignee: Eastman Kodak Company, Rochester, N.Y.

[21] Appl. No.: 09/165,981

[22] Filed: Oct. 2, 1998

[51] Int. Cl.$^7$ ................................. H02P 3/12
[52] U.S. Cl. ......................... 318/368; 318/380
[58] Field of Search .................. 318/379, 380, 318/368, 377, 459, 500; 388/928.1

[56] References Cited

U.S. PATENT DOCUMENTS

| | | | |
|---|---|---|---|
| 3,611,092 | 10/1971 | Wilmunder | 318/293 |
| 3,670,225 | 6/1972 | Kitaoka et al. | 318/270 |
| 3,845,366 | 10/1974 | Metzler et al. | |
| 3,858,674 | 1/1975 | Tabor | |
| 3,930,191 | 12/1975 | Loderer | 318/376 |
| 3,947,740 | 3/1976 | Tsuboi | 318/376 |
| 4,085,354 | 4/1978 | Harshberger, Jr. | |
| 4,216,420 | 8/1980 | Jinbo et al. | 318/370 |
| 4,223,855 | 9/1980 | Briedis | |
| 4,445,167 | 4/1984 | Okado | |
| 4,678,980 | 7/1987 | Sugimoto et al. | |
| 4,911,566 | 3/1990 | Imaseki et al. | |
| 4,922,161 | 5/1990 | Gilliland et al. | 318/269 |
| 4,967,133 | 10/1990 | Hasegawa | 318/798 |
| 5,038,244 | 8/1991 | Tuusa | |
| 5,099,184 | 3/1992 | Hornung et al. | |
| 5,283,470 | 2/1994 | Hadley et al. | |
| 5,361,022 | 11/1994 | Brown | |
| 5,659,231 | 8/1997 | Svarovsky et al. | |

OTHER PUBLICATIONS

Siskind, Charles S., *Electrical Machines, Direct and Alternating Current*, 2$^{nd}$ edition, McGraw–Hill, 1959, p. 210.

R. L. McIntyre, *Electric Motor Control Fundamentals*, McGraw–Hill, Inc., 1974, p. 31.

Miller, Rex and Miller, Mark R., *Electric Motor Controls*, Prentice–Hall, 1992, p. 214.

Model 513 DC Brushless Servo Drive from Copley Controls Corp., Westwood MA 02090 FAX: 617–329–4055, Tel: 617–329–8200, Publication date unknown.

Compumotor Digiplan 1993–94 *Positioning Control Systems and Drives*, p. A27.

*Primary Examiner*—Bentsu Ro
*Attorney, Agent, or Firm*—David A. Novais; Nelson Adrian Blish

[57] ABSTRACT

The present invention provides efficient dynamic braking of a DC motor to complement servo loop control. This invention uses a combined technique where, first, a reversed-torque signal is applied to a standard motor controller that then reverses armature current to initiate braking and, second, a dissipative load is switched between the DC voltage bus and ground in order to dissipate the regenerated current as the motor slows. As braking action continues, the dissipative load is repeatedly switched into and out of the circuit, whenever voltage on the DC voltage bus, caused by regenerated current, exceeds a selected threshold. Hysteresis is provided to maintain current flow for a controlled period, providing a pulse-width modulation of the switching action. The invention allows controlled, fast braking for repeated operations and improves overall servo positional control in high-inertia applications, such as for an image processing apparatus using an imaging drum. This invention also permits controlled braking in the event of power loss, using regenerated energy from the motor to power braking control circuitry.

6 Claims, 4 Drawing Sheets

METHOD AND APPARATUS FOR IMPROVED ELECTRONIC BRAKING OF A DC MOTOR

FIELD OF THE INVENTION

The present invention relates to systems that use a DC motor controlled by a servo loop, where it is useful or necessary to brake the motor quickly. The invention is useful in situations in which the DC motor drives a load having high kinetic energy, such as a rotating imaging drum of a laser printer, where it is useful to accelerate and decelerate the motor quickly, and where it is required that the motor be cycled regularly between rotation at high speed and full stop.

BACKGROUND OF THE INVENTION

DC motors and their supporting servo loops are widely used in applications that require driving a load having a high kinetic energy. One of the many uses of such motors is disclosed in U.S. Pat. No. 5,268,708, which describes an image processing apparatus arranged to form an intended image on a receiver secured to the periphery of an imaging drum while the drum is rotated past a printhead. In the device disclosed by U.S. Pat. No. 5,268,708, the imaging drum secures donor and receiver materials to its surface using a vacuum. In order to meet requirements for throughput productivity, the imaging drum rotates at high speed, moving the secured donor and receiver materials past a printhead that writes the image.

Although the presently known and utilized image processing apparatus is satisfactory, it is not without drawbacks. The imaging drum, which presents a high inertial load when spinning at 600 RPM or more, must be regularly stopped to allow unloading and reloading of donor and receiver materials. This stopping action must be repeated four times for each four-color proof sheet output, since the process to create each color separation requires loading and unloading a different donor sheet. With the current image processing apparatus, no active braking mechanism for the drum is applied; drum rotational speed is therefore constrained to an upper limit of approximately 600 RPM by the need to coast the drum to a stop between color separations. This also extends the amount of time required between color separations, reducing throughput of the device.

Drum braking would also be advantageous when accelerating the drum. The high inertial load presented by the drum complicates the task of acceleration to a high velocity due to overshoot, where the drum spins faster than required following acceleration. To allow quick acceleration, it would be advantageous to be able to apply some amount of braking to compensate for overshoot.

Braking a motor that drives a load of high kinetic energy requires dissipation of this energy in some manner. For example, in an imaging processing system such as that disclosed in U.S. Pat. No. 5,268,708, with its drum rotating at a high speed of 3,000 RPM, the kinetic energy of the rotating system is in the range of 1750 Watt-seconds. To brake the motor driving this drum requires that its kinetic energy be dissipated over some interval of time. The dissipation wattage for braking this drum in exactly 5 seconds would be computed as the following ratio:

1750 Watt-seconds/5 seconds=350 Watts

To be able to repeatedly stop the imaging drum within 5 seconds, the apparatus would be required to dissipate this amount of energy at regular intervals. This braking action can generate significant amounts of heat that must be removed efficiently from the image processing apparatus. At the same time, it is advantageous for this application to provide a controlled stop, in which the rotational position of the drum is known, to allow efficient loading and unloading of the imaging media.

There are a number of well-known methods for braking a DC motor and dissipating the kinetic energy of the motor and its load. Among these are mechanical methods that use friction, where brake pads or similar stopping devices are employed. However, mechanical braking introduces problems of wear, mechanical complexity, dust, and reliability. In addition, mechanical braking requires replacement parts and procedures, particularly for equipment having high inertial loads, such as the imaging drum of the type discussed above.

Conventional electrical braking methods for stopping a motor quickly include dynamic braking. This method works by reversing the flow of current in the motor armature while, at the same time, maintaining the motor field. This action effectively converts the rotating energy of the motor into current flow, so that the motor acts as a generator, producing a back-EMF current flow in reverse direction from the flow of drive current. A high-wattage braking resistor is then switched across the armature to dissipate this regenerated current, bringing the motor to a stop. The effective stopping speed is a function of resistance; the lower the resistor value (therefore, the greater the reversed current flowing through the armature), the faster the motor can be stopped. (Reference: Siskind, Charles S., *Electrical Machines, Direct and Alternating Current*, $2^{nd}$ edition, McGraw-Hill, 1959, page 210.) At the same time, the resistor value must also be high enough so that it limits the current flowing through the armature.

By itself, dynamic braking does not provide a means for controlling position while stopping the motor. There would be advantages to using dynamic braking within a servo loop that provides position control at all times during motor acceleration, steady-speed rotation, and deceleration.

Dynamic braking is effective when the motor rotates above a threshold RPM; when motor RPM drops to a low value, field collapse causes dynamic braking to be less effective. When large motors are used, this type of dynamic braking typically requires heavy-duty relays or contactors for switching current across the load resistor. Conventionally, this resistive load is positioned at or near the motor terminals.

A problem inherent to electrical dynamic braking is heat dissipation. Conventionally, dynamic braking is not considered as suitable for applications requiring frequent start-stop cycling because of the high amounts of heat generated by dissipation across a load resistor. (Reference: R. L. McIntyre, *Electric Motor Control Fundamentals*, McGraw-Hill, Inc., 1974, page 31.) Proposed solutions for frequent braking in applications with high inertial loads suggest using one or more high-wattage resistors switched by means of solid-state devices, but these solutions are not suited for the high wattage dissipation required for the image processing apparatus noted above; moreover, solutions that simply substitute solid state devices for relays are not well-suited to high-wattage applications, particularly where such solid state devices are required to operate over their linear region (where heat generation in the solid state device can quickly destroy the device).

Among numerous patents that disclose methods and devices for electronic braking are the following:

U.S. Pat. No. 4,223,855 (Briedis) describes an electromechanical braking system that applies friction pads against rotating shafts for stopping a reel-to-reel tape transport. As noted in the background description of this patent, friction wear degrades the pads over time and causes continually changing brake characteristics. To minimize this problem, the patent discloses the use of a combination of dynamic and mechanical (friction pad) braking.

U.S. Pat. No. 4,911,566 (Imaseki, et al.) discloses a braking control system for a thermal printhead that shortens braking time by using a combination of dynamic braking and negative-phase braking. This method first short-circuits motor feeder-terminals (a form of dynamic braking), then applies a reversed-polarity voltage to stop the motor. Notably, this method is used with a small motor and low inertial load, where the load is substantially smaller than that presented by the rotation of the imaging drum as noted above.

U.S. Pat. No. 3,845,366 (Metzler, et al.) discloses a constant-torque braking control system for a system utilizing multiple DC motors, such as a printing press. With this system, braking resistors are switched across the armatures of the motors to dissipate the current that results from generator action as the motors are slowed. This method provides effective motor braking, but sacrifices position control. Using this method allows the motors to be stopped; but this invention discloses no method to slow the motors to compensate for overshoot or to change motor speed.

U.S. Pat. No. 5,659,231 (Svarovsky, et al.) discloses braking control circuitry for a DC brushless motor that first stops drive current to the motor to set it coasting, then sets a voltage level to oppose a feedback signal, forcing regenerated current flow to a controlled level for dissipation in the power supply regulator circuitry of the motor controller. Notably, this method dissipates power in the motor controller itself, limiting the regenerated current below potentially damaging amounts by using control circuitry as a "valve" to restrict current feedback. Conventional motor controllers are capable of dissipating some current, but are not capable of providing dynamic braking for the type of high inertial load presented by a rotating drum in an image processing apparatus.

A secondary problem for motor braking occurs in the event of power loss. This condition can be destructive or hazardous for motor driven applications. For an image processing apparatus such as the one cited above, loss of power while the drum is at full speed rotation and is loaded with donor and receiver material that are secured to the drum under vacuum, can mean fly-off of the media and consequent damage to the optical print head and to other sensitive support components. For this reason, fast and efficient braking of the DC motor upon power loss presents important advantages for imaging systems and other types of equipment.

Dynamic braking requires that the field energy to the motor be maintained. For this reason, conventional electronic motor brakes do not function if power is lost or disconnected. (Reference: Miller, Rex and Miller, Mark R., *Electric Motor Controls,* Prentice-Hall, 1992, page 214.) However, a number of methods have been disclosed for providing sufficient field energy to allow at least some level of dynamic braking in the event of power loss. For example, U.S. Pat. No. 5,099,184 (Hornung, et al.) discloses circuitry for applying sufficient magnetic field for dynamic braking, for a time, in the event of power loss.

A number of patents disclose the use of the regenerative energy of the motor as it rotates with a reversed armature current (hence, acts as a generator) when slowed using dynamic braking methods. Examples include U.S. Pat. No. 5,659,231, cited above, as well as U.S. Pat. No. 4,678,980 (Sugimoto, et al.) and U.S. Pat. No. 4,445,167 (Okado, et al.) in which regenerative motor energy provides temporary source power for motor control circuitry.

While known practices, references, and patents such as those cited above disclose various ways to implement dynamic braking, there are significant limitations and shortcomings to conventional methods. Systems such as the image processing apparatus cited above present these special requirements for motor braking:

Position control. Conventional methods for dynamic braking do not provide position control when the motor is stopped.

Overshoot compensation. The methods described above disclose ways to stop a motor, rather than provide a means for slowing rotation momentarily to correct overshoot.

Fast acceleration and deceleration for a high inertial load. This requires dissipating high levels of current. Conventional commercial motor controllers provide some level of capability to dissipate regenerated motor energy as current. However, these solid-state devices are not designed to dissipate the high levels of energy required for inertial loads such as presented by the imaging drum noted above.

Frequent repeatability for a system having a high inertial load.

None of the patents and text references cited above disclose or suggest a suitable method for dynamic braking that varies the duty cycle of high levels of regenerated current across a dissipative load. Also, none of the patents or texts cited above suggest using such a method that operates both when controlled by machine commands and when power is lost. Further, these known methods do not implement dynamic braking within a servo loop. Additionally, these methods do not present a suitable process for switching a load across motor terminals using solid-state technology, given the high-wattage dissipation required for stopping an imaging drum.

SUMMARY OF THE INVENTION

The present invention provides for a system and method which overcomes the drawbacks noted above.

The present invention complements conventional servo loop control for DC motors to provide electronic braking by (1) providing a reverse-torque control signal, (2) sensing the DC voltage signal generated between the DC voltage bus and ground, and (3) selectively switching a dissipative load from the DC voltage bus to ground. Based on the sensed DC voltage feedback signal, the present invention varies the duty cycle of this switching action, effecting a pulse-width modulation that switches excess current to the load to dissipate the DC drive energy over controlled intervals. This action bleeds regenerated current from the motor, in discrete, short bursts, dissipating the kinetic energy due to motor rotation in a controlled manner so that the motor can be stopped quickly, even in applications having high levels of kinetic energy and in circumstances where power is lost.

It is an object of the present invention to implement electronic braking using a combination of conventional reverse-torque current input to slow the motor, followed by selectively switched dissipation of the regenerated motor current energy to a load, to quickly stop a DC motor that is operating with a high kinetic energy.

It is a further object of the present invention to quickly stop DC motor rotation whether the motor is slowed due to a reverse-torque current signal from machine control logic or due to sudden loss of source power.

An advantage of the present invention that it uses regenerated energy from the slowed motor to serve as source power for motor control circuitry, enabling the motor to be controllably stopped using this circuitry even when AC source power is lost.

It is a further advantage of the present invention that it allows the reverse-torque signal (applied to stop the motor), to be applied at higher levels than are normally otherwise used, since this invention provides an efficient means to dissipate the resulting regenerated EMF from the motor at a high rate. As a result, the motor can be stopped or reversed quickly.

It is a further advantage of the present invention that it allows dynamic braking to be implemented in a system having high inertial loads, where it is useful in an application to start and stop the drive motor repeatedly. For such a system, this invention dramatically improves servo loop performance by supplementing the power dissipation capability of the motor controller.

The present invention provides cost advantages, obviating the conventional requirement for costly heavy-duty switching relays or contactors at motor terminals, and allows the use of a lower wattage resistor than is typically specified for current dissipation.

It is a further advantage of the present invention that the same components used for repeated start-stop operation under machine control also act as braking components in the event of power loss.

It is a further advantage of the present invention that, provided power is not lost, it allows the servo loop to maintain position control of the motor during braking, allowing a decrease in velocity or even a reverse in velocity to be effected.

It is a further advantage of the present invention, when used in an image processing apparatus that employs a vacuum imaging drum, that it greatly reduces the possibility of fly-off of donor or receiver material from the rotating drum in the event of power loss. (Vacuum takes a few seconds to drop below the levels at which the drum can hold media sheets; with this invention, the motor is sufficiently slowed or stopped following power loss so that the media, when released from vacuum, does not damage other components in the apparatus.)

It is a further advantage of the present invention that it provides a method to compensate for overshoot resulting from acceleration in systems that have a sizeable inertial load.

The present invention relates to an apparatus for dynamic braking of a DC motor that is controlled by a servo loop. The apparatus comprises sensing circuitry which continuously senses a DC bus voltage supplied to a DC motor drive and compares the DC bus voltage to a first reference threshold voltage, with the sensing circuitry providing an output enabling signal when the DC bus voltage exceeds the first reference threshold voltage and an output disabling signal when the DC bus voltage drops to a second threshold voltage level below the first threshold voltage; and a switching component connected in series with a dissipative load to effect dynamic braking of the DC motor. The switching component is adapted to receive the output enabling signal and the output disabling signal from the sensing circuitry, such that upon receipt of the output enabling signal, the switching component connects the dissipative load across the DC bus voltage so that a regenerated current is drained from the DC motor as the DC motor slows, and upon receipt of the output disabling signal, the switching component disconnects the dissipative load from the DC voltage bus.

The present invention further relates to a method for dynamic braking of a DC motor. The method comprising the steps of: (a) reversing a DC motor armature current of the DC motor; (b) sensing a DC bus voltage resulting from the reversal of the DC motor armature current; (c) comparing the DC bus voltage with a first threshold voltage; (d) switching a dissipative load across the DC bus voltage when the comparison indicates that the DC bus voltage exceeds the first threshold voltage and a second thresheld voltage which is lower than said first threshold voltage; and (e) disconnecting the dissipative load from the DC bus voltage when the comparison indicates that the DC bus voltage has dropped below the second threshold voltage.

The present invention also relates to a method of controlling a braking of a motor which comprises the steps of applying a reverse-torque control signal to the motor; sensing a voltage signal generated between a DC voltage bus applied to a drive for the motor and ground; and selectively switching a dissipative load from the DC bus voltage to ground.

The present invention also relates to an apparatus for braking a motor which comprises a sensor which senses a voltage supplied to a drive for the motor and compares the voltage to at least one reference voltage; and a switching component operationally associated with a dissipative load, with the switching component being adapted to receive a signal from the sensor which is indicative of the sensed voltage, and in response thereto, control a connection and disconnection of the dissipative load to the voltage so as to initiate a braking of the motor.

The present invention further relates to an imaging apparatus comprising: an imaging drum; a printhead mounted adjacent to the imaging drum and movable along a line parallel to a rotational axis of the imaging drum; a motor for rotating the imaging drum about the rotational axis; and a dynamic braking apparatus for braking the motor. The dynamic braking apparatus comprises: a sensor which senses a voltage supplied to a drive for the motor and compares the voltage to at least one reference voltage; and a switching component operationally associated with a dissipative load, with the switching component being adapted to receive a signal from the sensor which is indicative of the sensed voltage, and in response thereto, control a connection and disconnection of the dissipative load to the voltage.

DETAILED DESCRIPTION OF THE INVENTION

The following description gives detailed information on the methods and apparatus used for the present invention. Detailed information on components well-known in the art are omitted.

Figure 1:
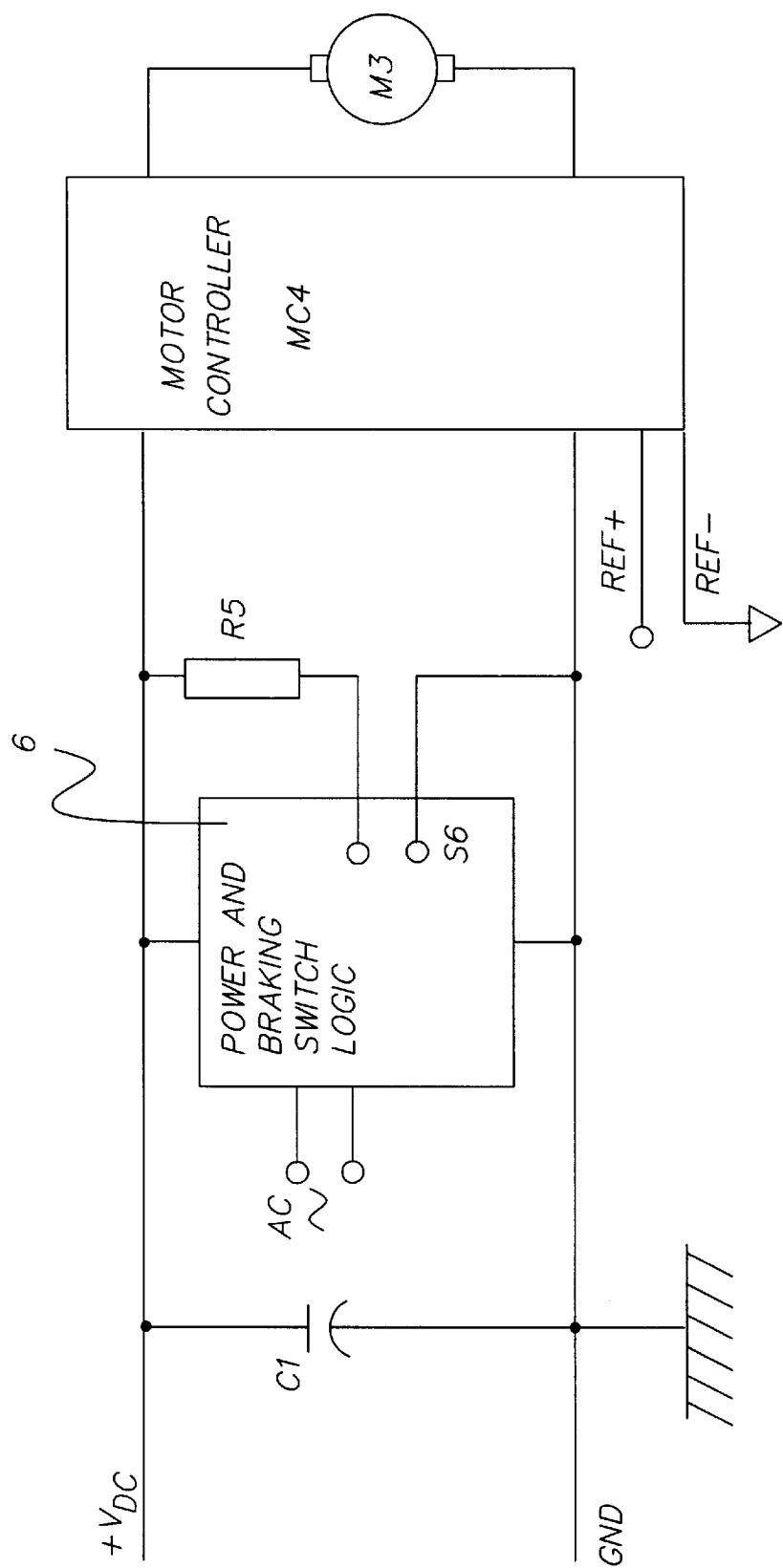
FIG. 1 shows a block diagram which illustrates a functional overview of the power supply and braking circuitry of the present invention.

Referring now to the drawings, wherein like reference numerals designate identical or corresponding parts throughout the figures, FIG. 1 illustrates a functional block diagram that shows the relative function of power and braking switch logic circuitry 6 within a motor control servo loop for a DC motor M3. A motor controller MC4 can be any of a number of standard DC servo motor drives (for example, Model 513 DC Brushless Servo Drive from Copley Controls Corp., Westwood, Mass.). As shown in FIG. 1, motor controller MC4 accepts as an input a DC power supplied by power and braking switch logic circuitry 6. This power is itself derived using techniques well-known in the art for converting input AC voltage to DC (typically using a conventional diode bridge rectifier). A large capacitor C1 smoothes a DC bus voltage $+V_{DC}$ by absorbing transients in the DC signal, and, as a secondary function, delays decay of DC bus voltage $+V_{DC}$ in the event of power loss.

Motor controller MC4 also has REF+/REF− inputs for a variable signal from the servo loop control circuitry 20 (FIG. 2) that controls motor torque. The servo loop control circuitry 20 sets the REF+ input to the proper analog signal levels to control DC motor M3 rotation at the proper speeds. The relative difference between these two REF+/REF− inputs determines motor torque, hence motor speed for the given load. At full speed, the motor that drives an imaging drum for the preferred embodiment of this invention rotates at 3000 rpm. This gives the rotating system a kinetic energy of approximately 1750 Watt-seconds.

As is illustrated conceptually in FIG. 1, power and braking switch logic circuitry 6 controls switch S6 that is configured to connect a dissipative load (shown in FIG. 1 as shunt resistor R5) to ground. The discussion that follows describes how switch S6 is implemented in the preferred embodiment of this invention, using solid-state technology and how the timing of the switching action is controlled.

Stopping Under Servo Loop Control

To stop the motor during operation, the servo loop control logic, from a digital servo controller 14, switched through relay K1, sends a reversed-polarity analog control signal 10 to REF+ input of motor controller MC4. This action reverses motor armature current and thus slows DC motor M3 rapidly. With motor armature current flowing in the reverse direction, the excess kinetic energy stored in rotating motor M3 is now transformed into current, flowing in the opposite direction from the drive current, as DC motor M3 acts as a current generator. Current flows back into motor controller MC4 and raises DC bus voltage level $+V_{DC}$ that is input to the motor drive. This DC bus voltage level $+V_{DC}$ is also sensed by power and braking switch logic circuitry 6.

Figure 2:
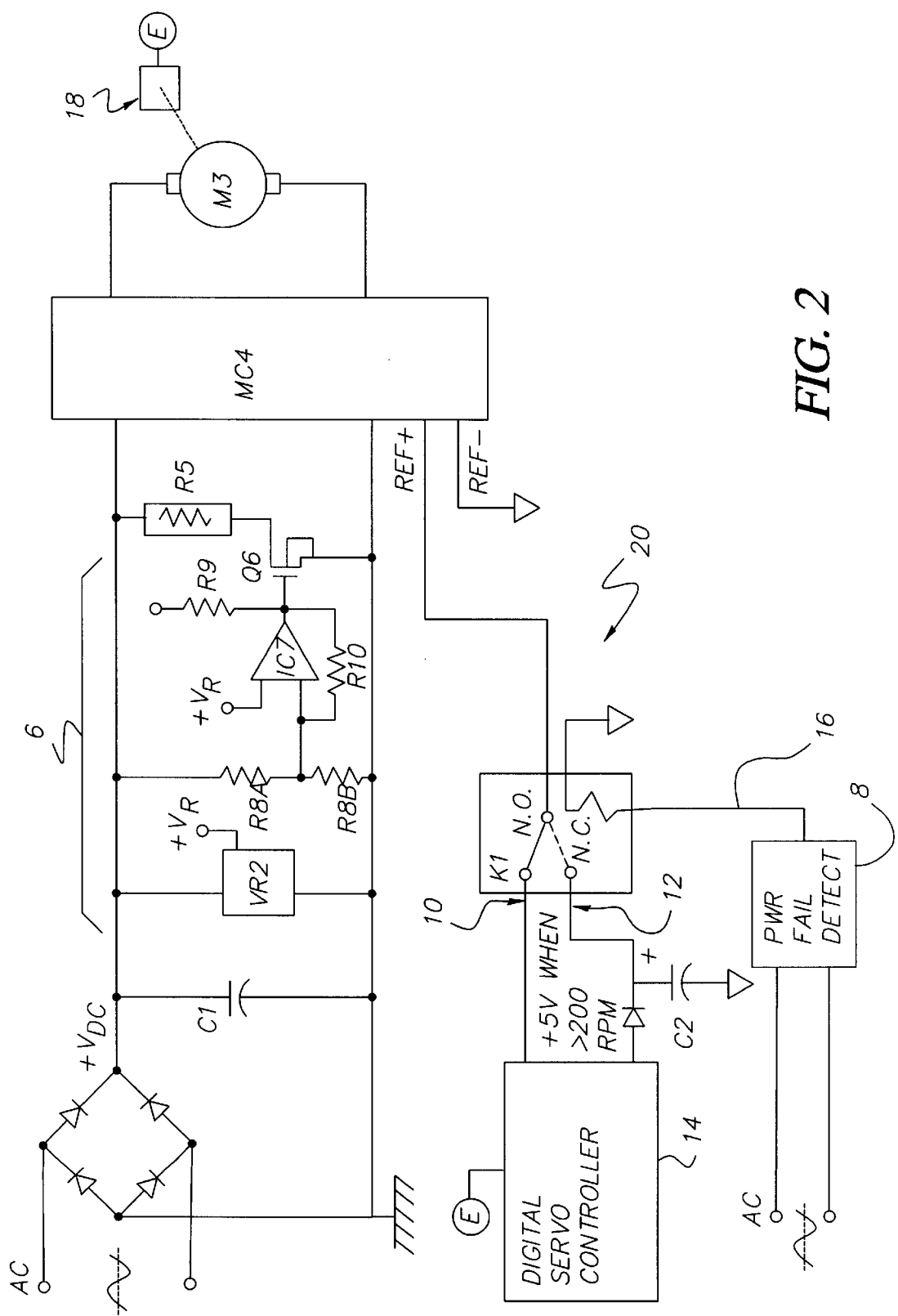
FIG. 2 shows a more detailed block diagram illustrating key components of the braking circuitry for switching current to a resistive load.

The detailed block diagram of FIG. 2 illustrates how the circuitry that implements this invention responds to the increase in DC bus voltage $+V_{DC}$ as DC motor M3 slows down. Sensing circuitry which includes a voltage comparator IC7 senses the DC bus voltage at its non-inverting input, sampled across a voltage divider comprising resistors R8A and R8B. Voltage comparator IC7 compares this sampled voltage against a reference voltage $+V_A$. When DC bus voltage $+V_{DC}$ exceeds an upper threshold value, typically 185 V DC, an output enabling signal is provided and voltage comparator IC7 switches a switching component in the form of high-current transistor Q6 on. (High-current transistor Q6 can be a device such as an Insulated Gate Bipolar Transistor, IGBT, HGTP20N60C3, or power MOSFET IRF730, both manufactured by Harris Corp., Melbourne, Fla.)

High-current transistor Q6 switches shunt resistor R5 between the DC bus and ground. Rated for low resistance and high wattage, shunt resistor R5 dissipates, as heat, the excessive current being fed back from DC motor M3.

As shunt resistor R5 dissipates current to ground, voltage $+V_{DC}$ begins to drop. To hold high-current transistor Q6 on until voltage $+V_{DC}$ drops to a level below the upper threshold level, resistors R9 and R10 provide hysteresis for voltage comparator IC7, as is well-known in the art. At a lower threshold level, typically 180 V DC, an output disabling signal is provided and voltage comparator IC7 then switches off, immediately switching high-current transistor Q6 off.

Figure 3A:
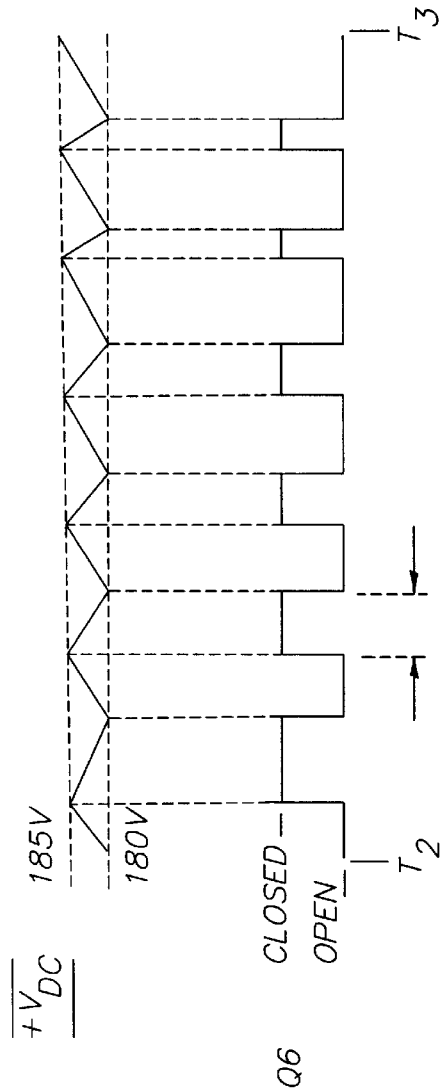
FIG. 3a shows a timing diagram that illustrates switching timing for conducting current to the load, relative to sensed voltage from the motor during braking.

By switching high-current transistor Q6 on at an upper threshold voltage and off at a slightly lower threshold voltage, hysteresis helps to prevent an oscillation ("chatter") condition for switching high-current transistor Q6 or operation of high-current transistor Q6 in a linear range. More importantly, hysteresis provides a controlled, pulse-width modulated switching signal for high-current transistor Q6, as is indicated in FIG. 3a. Values shown are for the preferred embodiment of this invention, where high-current transistor Q6 is switched on at +185 $V_{DC}$ and off at +180 $V_{DC}$. Notably, high-current transistor Q6 is operated only fully on or fully off. It is recognized that the present invention is not limited to this described range of +185 $V_{DC}$ and +180 $V_{DC}$, and that this range can be determined by the appropriate value of resister R10 of FIG. 2. Further, multiple threshold voltages can be utilized in order to employ variable discrete amounts of dynamic braking. Except for inherent time delays for switching on and off, high-current transistor Q6 does not operate in a linear mode. This minimizes heat dissipation at high-current transistor Q6.

Figure 3B:
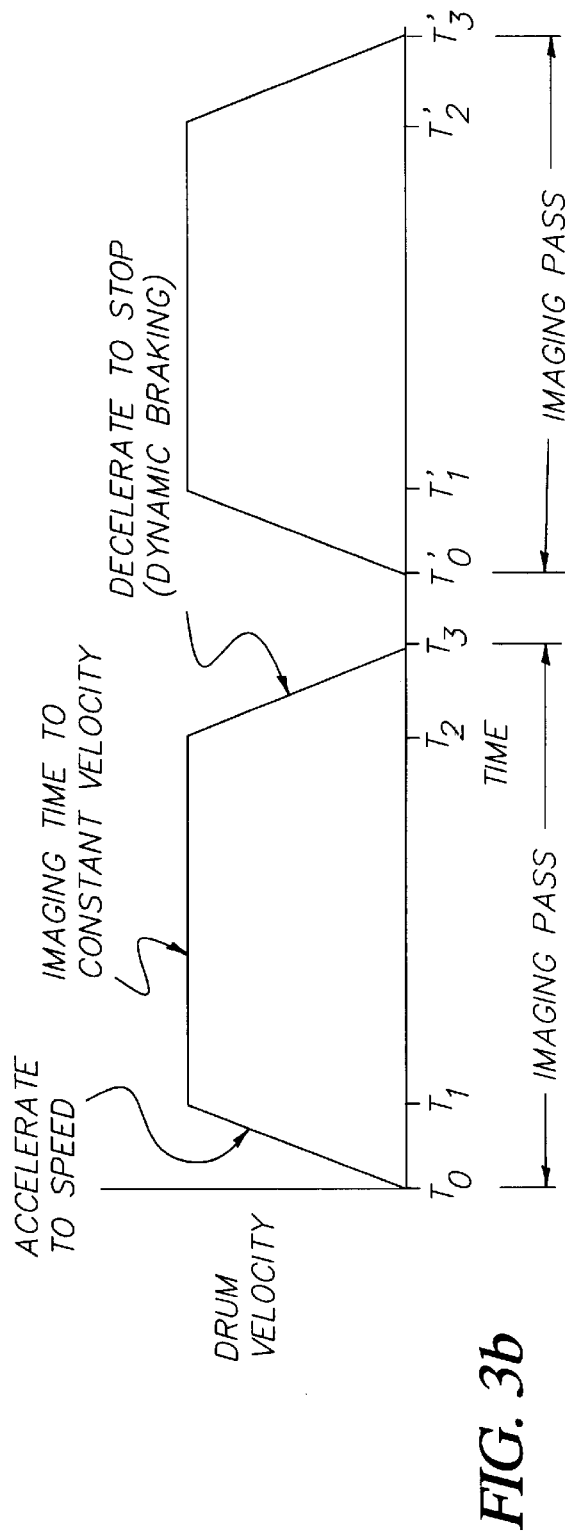
FIG. 3b shows a graph which illustrates drum velocity vs. time for an imaging pass.

As the motor slows, voltage comparator IC7 repeatedly switches high-current transistor Q6 on and off, connecting and disconnecting shunt resistor R5 in this pulse-width modulated fashion to dissipate regenerated current from DC motor M3. The timing chart in FIG. 3a shows simplified timing relationships for this repeated switching. The graph of FIG. 3b illustrates drum velocity vs. time. In FIG. 3b, two imaging passes of multiple imaging passes for an imaging apparatus as previously discussed are shown; with a first imaging pass being represented by T0 to T3, and a second or subsequent imaging pass being represented by T0' to T3'. As shown in FIG. 3b, in the first imaging pass, the drum accelerates from T0 to T1 and runs at a constant velocity from T1 to T2. Deceleration occurs from T2 to T3, which is also represented in the timing chart of FIG. 3a. The bulk of the dynamic braking occurs from T2 to T3, however, the heat is allowed to dissipate from T2 to T2' of the second or subsequent imaging pass. The result is a low duty cycle of current through shunt resistor R5 which effectively means low RMS current, and corresponding low amounts of heat, dissipated over time.

Typically, a fan is used to cool shunt resistor R5, which may require special mounting and placement considerations to allow effective heat dissipation.

Controlled deceleration

Feedback signal E from an encoder 18 (FIG. 2) is input to digital servo controller 14 for overall servo loop control. To slow DC motor M3 while maintaining positional control, digital servo controller 14 sets analog control signal 10 to an appropriate voltage causing negative torque. Relay K1 in position N.O. routes analog control signal 10 to REF+ input of motor controller MC4, initiating electronic braking. When this occurs, voltage comparator IC7 operates as described above, controlling the on/off action of switch Q6 to dissipate regenerated current across shunt resistor R5. Digital servo controller 14 then regulates analog control signal 10 until feedback signal E from encoder 18 indicates that DC motor M3 is running at the required slower speed.

Stopping when power is lost

FIG. 2 further shows how this invention provides dynamic braking in the event of power loss. Normally (before power loss), digital servo controller 14 provides analog control signal 10 that provides the input torque signal, REF+. Relay K1 switches analog control signal 10 to REF+ when power is applied. Power fail detect circuitry 8 senses the loss of input AC power and responds by providing a power lost output control signal and dropping relay control signal 16 to an off state. In response, relay K1 switches to position N.C. to provide a power loss logic signal in the form of an artificial negative torque signal 12 to REF+. Digital servo controller 14 sets artificial negative torque signal 12 to +5 V whenever DC motor M3 is at 200 RPM or greater, based on input E from encoder 18. This artificial negative torque signal 12 causes motor controller MC4 to reverse armature current, which initiates dynamic braking. Capacitor C2 provides some delay for the artificial negative torque signal 12 in the moments following power loss.

Relay K1 is a low cost, low current instrumentation-level relay, mounted directly on a printed-circuit board, as is well-known in the art. (In the preferred embodiment, a relay such as T85N11D114-05 from Siemens Electromechanical Components, Inc. is used.)

In the event of power loss, this invention uses the regenerated energy from DC motor M3, which acts as a generator as it continues to turn when its driving armature current has been reversed, since storage means in the form of capacitor C1 retains enough stored energy to maintain a field in the motor windings for some interval. Upon power loss, generated current from DC motor M3 flows back through motor controller MC4. This current allows sufficient input voltage on the DC voltage bus to provide source power for a voltage regulator circuitry VR2. Voltage regulator circuitry VR2 continues to provide the source voltage needed for operation of voltage comparator IC7 and its reference voltages, $+V_A$ and the voltage at resistive divider R8A/R8B. Voltage comparator IC7 switches high-current transistor Q6 on, periodically switching shunt resistor R5 for some interval, as during normal servo loop-initiated stoppage. Capacitor C1 provides a time delay that extends the interval during which DC bus voltage is maintained within operating range for the electronic braking circuitry of this invention. Braking action continues until the field collapses due to reduced speed of DC motor M3 rotation.

Overshoot behavior

This invention allows the servo loop to quickly bring DC motor M3 to the desired velocity following acceleration. During acceleration, digital servo controller 14 tracks DC motor M3 RPM via encoder 18 output signal E. When motor RPM exceeds the desired value, digital servo controller 14 momentarily applies a reverse torque signal output at analog control signal 10. This signal at REF+ reverses armature current and momentarily enables the dynamic braking action described above. When DC motor M3 decelerates to nearly the correct RPM, digital servo controller 14 sets analog control signal 10 to an appropriate level to maintain the desired velocity.

Sizing components

Component values for shunt resistor R5 and for precision resistors R8A and R8B used for voltage dividers must be selected based on known values from the application (for example, based on the motor load) and on stopping requirements. For the imaging drum application of the preferred embodiment of this invention, the goal is to stop the imaging drum within 5 seconds. As noted above, the computed power level for dissipation at top speed is 350 Watts. For the specific application, the value of shunt resistor R5 is computed based on characteristics of the motor and on typical supplied voltages, as in this example:

350 Watts=175 $V \times 2\ A$

Resistance (ohms)=$V/A$=175/2 87.5 ohms

For the preferred embodiment of this invention, a resistor of approximately 87.5 ohms, rated at 350 Watts, would then provide reasonably good power dissipation. However, since the actual RMS duty cycle of current through the resistor during dynamic braking using this method is typically less than 50%, a smaller resistor can be used, provided the selected resistor is rated to handle peak power values. In actual practice, a 50 ohm, 200 Watt resistor proved satisfactory for the preferred embodiment of this invention.

Figure 4:
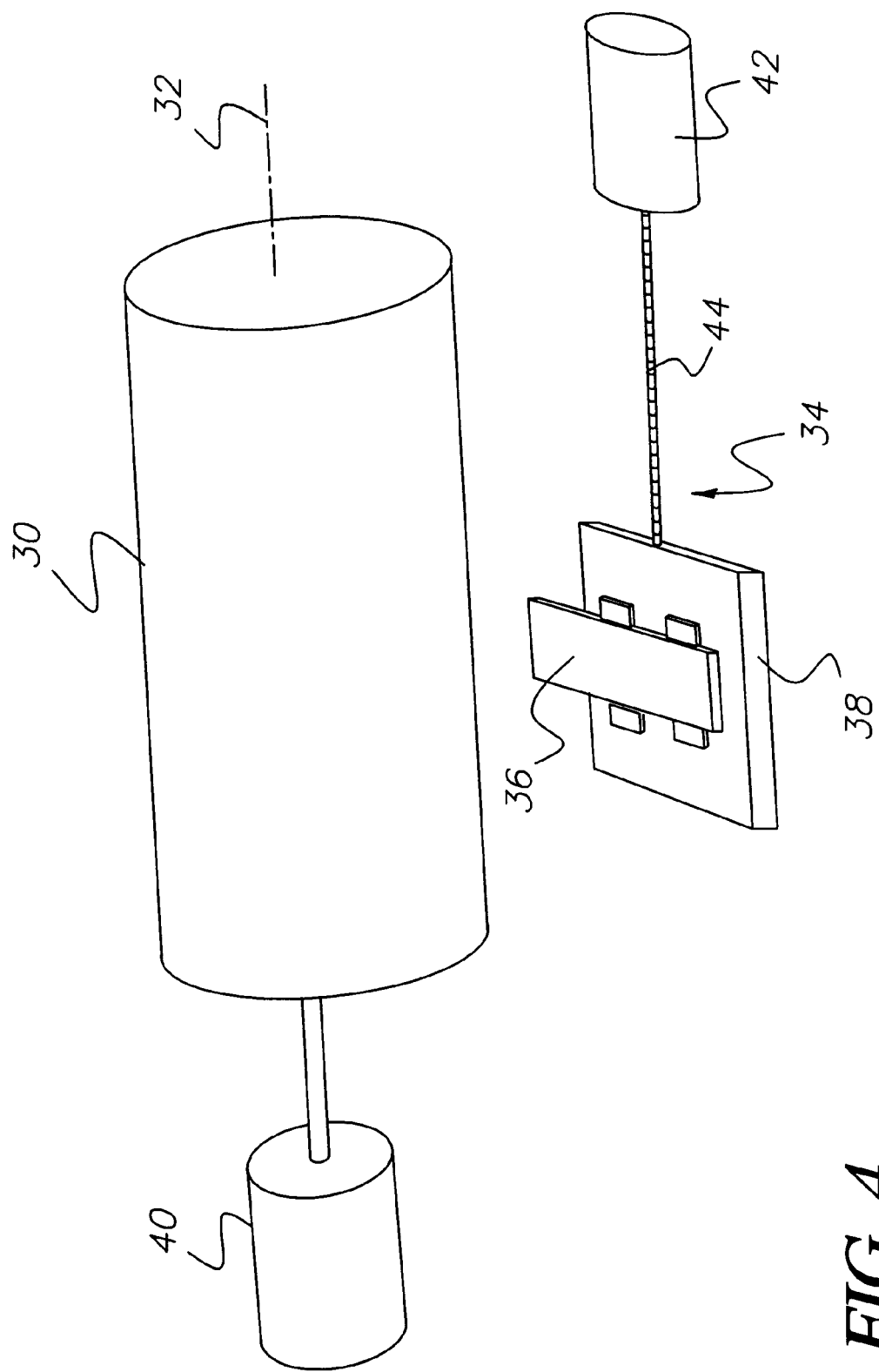
FIG. 4 is a schematic diagram showing an example of an image processing arrangement to which the system of the present invention can be applied.

FIG. 4 schematically shows one example of implementation of the present invention. As illustrated in FIG. 4, an imaging drum 30 is mounted for rotation about an axis 32. Imaging drum 30 is adapted to support a print medium such as one wherein a colorant is transferred from a donor sheet to a receiver sheet as a result of heating the colorant in the donor sheet. The donor sheet and the receiver sheet are superposed in intimate contact and are held onto the peripheral surface of drum 30 by vacuum applied to the superposed sheets from the interior of drum 30.

A movable writing head assembly 34 is movably supported adjacent imaging drum 30 and includes a printhead 36 which is mounted on a translator member 38. A DC motor 40 rotates imaging drum 30 about axis 32, while a stepper motor 42 rotates a lead screw 44 to move printhead 36 parallel to axis 32 of drum 30. A detailed example of such an image processing system is disclosed in U.S. Pat. No. 5,268,708. The arrangement of the present invention is advantageous in controlling the braking of motor 40 and drum 30 in a precise manner which is advantageous during image processing as previously described. It is recognized that this is one example of implementation of this invention and that the present invention is applicable to various implementations where it is desired to brake a motor having high inertial loads.

The invention has been described with reference to the preferred embodiment thereof. However, it will be appreciated and understood that variations and modifications can be effected within the spirit and scope of the invention, as described herein above and as defined in the appended claims, by a person of ordinary skill in the art, without departing from the scope of the invention. For example, as discussed above, this invention is applicable to any application where it is useful to brake a DC motor, particularly with high inertial loads. This includes imaging and other applications. The invention can be used in combination with mechanical means for braking the motor, or with other types of motor controllers than are described above. Also, the motor could be simultaneously slowed during part of its deceleration using additional mechanical friction means. Switching means for the resistive load (switch S6 shown in FIG. 1) can be selected from a number of suitable types of solid-state devices, provided that (for high-wattage applications) support circuitry ensures that solid-state switches do not operate within their linear region. The type of dissipative load used can be a conventional shunt resistor or some other device employed for current dissipation.

The invention has been described in detail with particular reference to certain preferred embodiments thereof, but it will be understood that variations and modifications can be effected within the spirit and scope of the invention.

What is claimed is:

1. An apparatus for dynamic braking of a DC motor that is controlled by a servo loop, the apparatus comprising:

sensing circuitry which continuously senses a DC bus voltage supplied to a DC motor drive and compares the DC bus voltage to a first reference threshold voltage, said sensing circuitry providing an output enabling signal when the DC bus voltage exceeds said first reference threshold voltage, and an output disabling signal when the DC bus voltage drops to a second threshold voltage level below said first threshold voltage;

a switching component connected in series with a dissipative load to effect dynamic braking of said DC motor, said switching component being adapted to receive said output enabling signal and said output disabling signal from said sensing circuitry, such that upon receipt of said output enabling signal, said switching component connects said dissipative load across the DC bus voltage so that a regenerated current is drained from said DC motor as said DC motor slows, and upon receipt of said output disabling signal, said switching component disconnects said dissipative load from the DC voltage bus; and a motor controller operationally associated with said sensing circuitry, said dissipative load and said switching component, said motor controller providing a reversing armature current to said DC motor, such that an interaction of said motor controller, said sensing circuitry, said dissipative load and said switching component enables dynamic braking of said DC motor in a pulse-width modulated manner, and a timing and time interval duration over which regenerated current flows through said dissipative load corresponds to the DC bus voltage levels sensed by said sensing circuitry.

2. An apparatus according to claim 1, further comprising:

a power fail detection circuitry that senses loss of AC input voltage and provides a power lost output control signal which causes said motor controller to provide a reversing armature current to said DC motor; and storage means for maintaining an electrical field to said DC motor when power is lost.

3. An apparatus according to claim 2, further comprising:

a digital servo controller that provides an analog control signal for DC motor torque to said motor controller, and a power loss logic signal which is generated when said DC motor has an RPM sufficiently high to allow dynamic braking, said power loss logic signal acting as a reverse torque signal to the motor controller to initiate braking action.

4. An apparatus according to claim 3, further comprising:

a switching relay component that selectively routes, from said digital servo controller to said motor controller, either said analog control signal or said power loss logic signal, said switching relay component being switched to route said power loss logic signal to said motor controller when said switching relay component receives said power lost output control signal from said power fail detection circuitry.

5. An apparatus according to claim 1, further comprising:

an encoder operationally associated with said DC motor for providing a feedback signal to said motor controller.

6. A method for dynamic braking of a DC motor, the method comprising steps of:

reversing a DC motor armature current of the DC motor;

sensing a DC bus voltage resulting from said reversal of said DC motor armature current;

comparing said DC bus voltage with a first threshold voltage;

switching a dissipative load across said DC bus voltage when said comparison indicates that said DC bus voltage exceeds said first threshold voltage and a second threshold voltage which is lower than said first threshold voltage;

disconnecting said dissipative load from said DC bus voltage when said comparison indicates that said DC bus voltage has dropped below said second threshold voltage;

sensing power loss from an AC line and providing a power lost output control signal indicative thereof;

providing an artificial power loss logic signal with a polarity and voltage level so that said artificial power loss logic signal acts as a reverse-torque signal when applied as input to a motor controller circuitry of the DC motor;

switching said power loss logic signal to said motor controller circuitry based on sensed power loss, as indicated by said power lost output control signal; and storing sufficient DC voltage from a power supply circuitry to maintain a field in the DC motor for a sufficient interval following power loss to provide dynamic braking.

* * * * *